United States Patent
Forster

(10) Patent No.: US 7,411,498 B2
(45) Date of Patent: Aug. 12, 2008

(54) RFID TESTING AND CLASSIFICATION SYSTEMS AND METHODS

(75) Inventor: Ian J. Forster, Chelmsford (GB)

(73) Assignee: Avery Dennison, Pasadena, CA (US)

( * ) Notice: Subject to any disclaimer, the term of this patent is extended or adjusted under 35 U.S.C. 154(b) by 0 days.

(21) Appl. No.: 11/101,226

(22) Filed: Apr. 7, 2005

(65) Prior Publication Data

US 2006/0226982 A1    Oct. 12, 2006

(51) Int. Cl.
*G08B 13/14* (2006.01)
(52) U.S. Cl. .................. 340/572.1; 340/10.1
(58) Field of Classification Search ........... 340/572.1, 340/572.4, 10.1, 10.2, 10.3
See application file for complete search history.

(56) References Cited

U.S. PATENT DOCUMENTS

| | | | |
|---|---|---|---|
| 4,802,216 A | 1/1989 | Irwin et al. | |
| 5,983,363 A | 11/1999 | Tuttle et al. | |
| 6,104,291 A | 8/2000 | Beauvillier et al. | |
| 6,219,543 B1 | 4/2001 | Myers et al. | |
| 6,236,223 B1 | 5/2001 | Brady et al. | |
| 6,246,326 B1 | 6/2001 | Wiklof et al. | |
| 6,288,629 B1 * | 9/2001 | Cofino et al. | 340/10.1 |
| 6,326,889 B1 | 12/2001 | Van Horn et al. | |
| 6,346,881 B1 | 2/2002 | Davidson | |
| 6,359,561 B2 | 3/2002 | Tuttle et al. | |
| 6,409,401 B1 | 6/2002 | Petteruti et al. | |
| 6,412,086 B1 | 6/2002 | Friedman et al. | |
| 6,445,297 B1 | 9/2002 | Nicholson | |
| 6,486,769 B1 | 11/2002 | McLean | |
| 6,487,681 B1 | 11/2002 | Tuttle et al. | |
| 6,545,605 B2 | 4/2003 | Von Horn et al. | |
| 6,593,853 B1 | 7/2003 | Barrett et al. | |
| 6,784,789 B2 | 8/2004 | Eroglu et al. | |
| 6,784,813 B2 * | 8/2004 | Shanks et al. | 341/53 |
| 6,806,812 B1 | 10/2004 | Cathey | |
| 6,933,848 B1 | 8/2005 | Stewart et al. | |
| 7,132,946 B2 | 11/2006 | Waldner et al. | |
| 7,151,442 B1 | 12/2006 | Nguyen | |
| 7,298,266 B2 | 11/2007 | Forster | |
| 2001/0002106 A1 | 5/2001 | Tuttle et al. | |
| 2002/0186004 A1 | 12/2002 | Prazeres da Costa | |
| 2004/0032443 A1 | 2/2004 | Moylan et al. | |

(Continued)

FOREIGN PATENT DOCUMENTS

JP    2003/076946    3/2003

(Continued)

*Primary Examiner*—John A Tweel, Jr.
(74) *Attorney, Agent, or Firm*—MacPherson Kwok Chen & Heid LLP; Greg J. Michelson

(57) ABSTRACT

Systems and methods are disclosed herein to provide radio frequency identification (RFID) test techniques. For example, in accordance with an embodiment of the present invention, an RFID test system includes a transmission system for providing a radio frequency signal to a plurality of RFID devices and a plurality of radio frequency detectors configured to detect a response to the radio frequency signal from the corresponding RFID devices. A circuit is coupled to the radio frequency detectors and adapted to determine whether each of the plurality of RFID devices is operational based on whether the response was detected by the corresponding radio frequency detector. The RFID devices, for example, that fail the test may be provided with an identifying mark or disabled with a kill command.

25 Claims, 5 Drawing Sheets

U.S. PATENT DOCUMENTS

| | | |
|---|---|---|
| 2004/0075607 A1 | 4/2004 | Cathey |
| 2004/0160233 A1 | 8/2004 | Forster |
| 2004/0178267 A1 | 9/2004 | Tsirline et al. |
| 2004/0215350 A1 | 10/2004 | Roesner |
| 2005/0045723 A1 | 3/2005 | Tsirline et al. |
| 2005/0045724 A1 | 3/2005 | Tsirline et al. |
| 2005/0068179 A1 | 3/2005 | Roesner |
| 2005/0150102 A1 | 7/2005 | Bosco et al. |
| 2006/0012387 A1 | 1/2006 | Shanks |

FOREIGN PATENT DOCUMENTS

| | | |
|---|---|---|
| JP | 2003/076947 | 3/2003 |
| JP | 2003/099719 | 4/2003 |
| JP | 2003/099720 | 4/2003 |
| JP | 2003/099721 | 4/2003 |
| JP | 2003/168082 | 6/2003 |
| JP | 2003/168098 | 6/2003 |
| JP | 2003/187213 | 7/2003 |
| JP | 2003/331220 | 11/2003 |
| WO | WO 00/28339 | 5/2000 |
| WO | WO 01/65517 | 9/2001 |
| WO | WO 02/14884 | 2/2002 |
| WO | WO 02/088762 | 11/2002 |
| WO | WO 2004/084119 | 9/2004 |
| WO | WO 2004/088571 | 10/2004 |
| WO | WO 2004/095350 | 11/2004 |

* cited by examiner

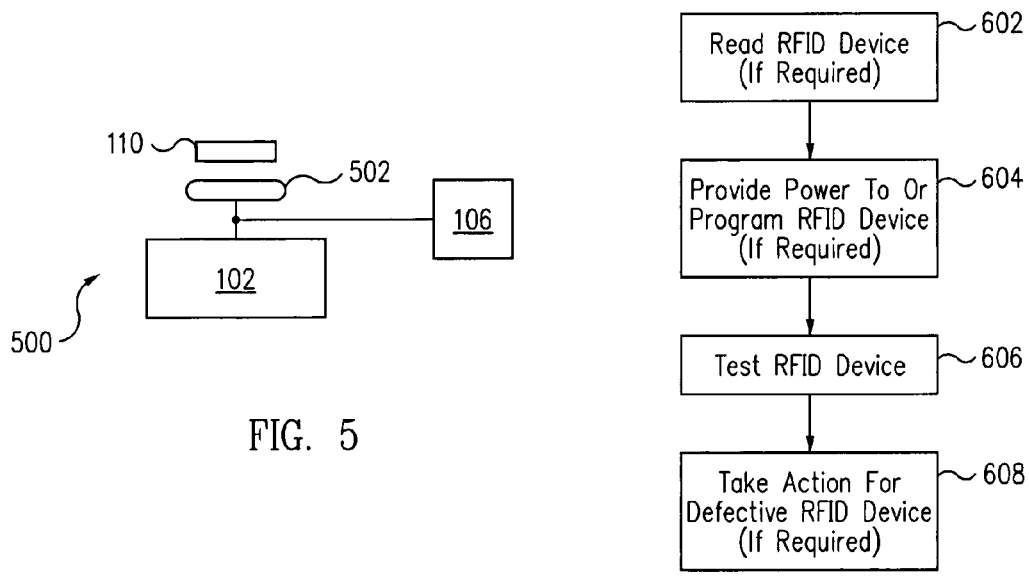
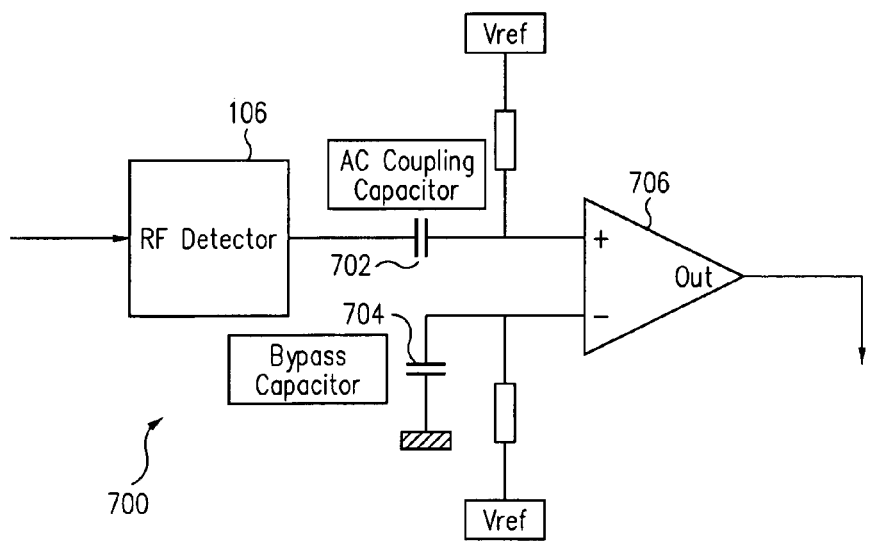

RFID TESTING AND CLASSIFICATION SYSTEMS AND METHODS

TECHNICAL FIELD

The present invention relates generally to radio frequency identification (RFID) applications and, more particularly, to RFID device testing and classification.

BACKGROUND

The use of radio frequency identification (RFID) devices (e.g., RFID tags, RFID labels, RFID chips, RFID straps, or RFID inlays) is growing rapidly, with RFID devices utilized in a wide variety of applications. However, one challenge associated with RFID devices is the manufacture and testing of the RFID devices in a high-volume and cost-effective manner.

For example, a conventional method of testing RFID devices during the manufacturing process involves bi-directional communication with each of the RFID devices at one or more defined frequencies and radio frequency power levels. However, the bi-directional communication technique of activating and reading the complete response from the RFID device is time consuming and requires a specialized RFID reader that is expensive and may not be optimized for rapid testing. Furthermore, because the RFID reader is expensive, the number of RFID readers is typically limited and utilized sparingly to serially test the RFID devices, with each of the RFID devices sequentially positioned into test position or the RFID reader sequentially moved from one RFID device to the next in a designated test area. Thus, the testing process may be limited in terms of the number of RFID devices that can be tested in a cost effective manner.

Another challenge associated with RFID devices is the handling (or classifying) of RFID devices that are tested and found to be defective. For example, the RFID devices may be manufactured or otherwise closely positioned on a roll or sheet of material (e.g., a carrier web or roll format). If the defective RFID device is not identified and/or discarded (e.g., destroyed) in some fashion, a purchaser of the roll of RFID devices may attempt to utilize the defective RFID device (e.g., to associate the RFID device with a product for inventory tracking purposes), with undesirable consequences. As a result, there is a need for improved test techniques for RFID devices and procedures for handling defective RFID devices.

SUMMARY

Systems and methods are disclosed herein to provide radio frequency identification (RFID) test techniques and techniques directed to RFID devices that are determined to be defective. For example, in accordance with an embodiment of the present invention, a test system is disclosed that determines whether an RFID device is defective based upon whether the RFID device responds when expected. Because it is not required to receive the complete response, the test time is decreased and test equipment costs are reduced, which permits cost-effective parallel testing (e.g., high-speed testing) of a large number of RFID devices. Furthermore, the defective RFID devices may be marked or disabled electronically, for example, by issuing a kill command to the RFID devices that disables only the defective RFID devices.

More specifically, in accordance with one embodiment of the present invention, an RFID test system includes a transmission system for providing a radio frequency signal to a plurality of RFID devices; a plurality of radio frequency detectors configured to detect a response to the radio frequency signal from the corresponding RFID devices; and a circuit coupled to the radio frequency detectors and adapted to determine whether each of the plurality of RFID devices is operational based on whether the response was detected by the corresponding radio frequency detector.

In accordance with another embodiment of the present invention, an RFID device test system includes means for providing a signal to at least one RFID device; means for detecting if the at least one RFID device responds based on a portion of any reply provided by the at least one RFID device to the signal; and means for determining if the at least one RFID device is operational based on whether the at least one RFID device responds.

In accordance with another embodiment of the present invention, an RFID device test system includes means for programming at least one RFID device to a first value; and means for providing a kill command to the at least one RFID device to disable the at least one RFID device that fail to store the first value.

In accordance with another embodiment of the present invention, a method of performing RFID device testing includes providing a signal to at least one RFID device; detecting if the at least one RFID device begins to respond to the signal; and determining if the at least one RFID device is operational based upon whether the at least one RFID device begins to respond to the signal.

In accordance with another embodiment of the present invention, a method of performing RFID device testing includes programming a plurality of RFID devices with a first value; and providing a kill command to the plurality of RFID devices, wherein the RFID devices of the plurality of RFID devices, which fail to store the first value, will be disabled.

The scope of the invention is defined by the claims, which are incorporated into this section by reference. A more complete understanding of embodiments of the present invention will be afforded to those skilled in the art, as well as a realization of additional advantages thereof, by a consideration of the following detailed description of one or more embodiments. Reference will be made to the appended sheets of drawings that will first be described briefly.

BRIEF DESCRIPTION OF THE DRAWINGS

FIG. 5 shows a block diagram illustrating an RFID test system in accordance with an embodiment of the present invention.

FIG. 6 shows a flowchart providing exemplary operations for an RFID test system in accordance with an embodiment of the present invention.

FIG. 7 shows a block diagram illustrating an RF detector circuit in accordance with an embodiment of the present invention.

DETAILED DESCRIPTION

Figure 1:
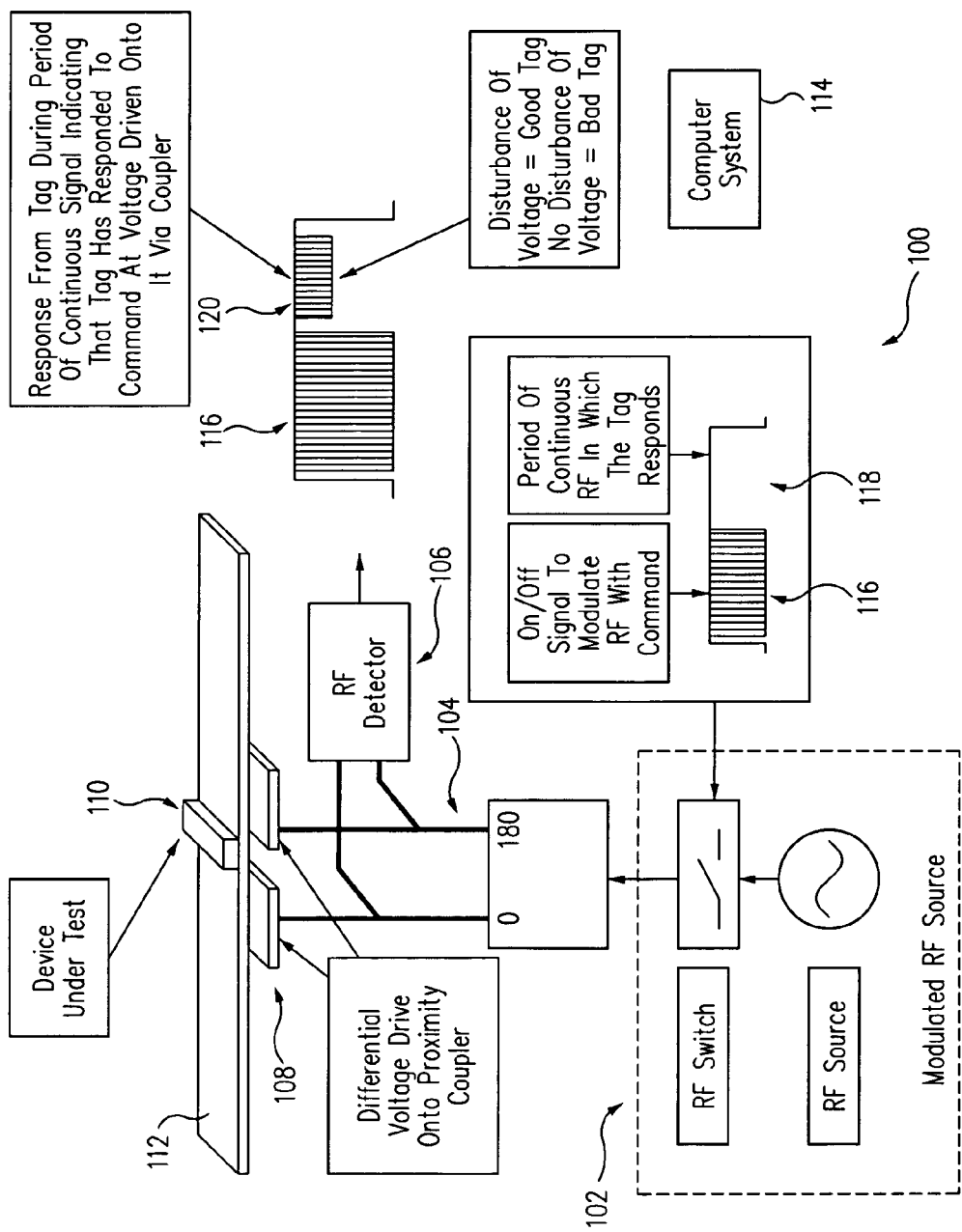
FIG. 1 shows a block diagram illustrating an RFID test system in accordance with an embodiment of the present invention.

Embodiments of the present invention and their advantages are best understood by referring to the detailed description that follows. It should be appreciated that like reference numerals are used to identify like elements illustrated in one or more of the figures.

FIG. 1 shows a block diagram illustrating an RFID test system 100 in accordance with an embodiment of the present invention. RFID test system 100 includes a radio frequency (RF) transmitter 102, a signal path 104, an RF detector 106, and a coupler 108.

RF transmitter 102 represents any type of RF transmitter, as would be understood by one skilled in the art, which can provide an RF signal to an RFID device 110 (e.g., an RFID tag, an RFID label, an RFID chip, an RFID strap, or an RFID inlay). RF transmitter 102 may include an RF source, which can be modulated to provide a command to RFID device 110, and an RF switch.

The RF signal from RF transmitter 102 may be provided to RFID device 110, for example, via signal path 104 and coupler 108. As an example, signal path 104 may represent two differential signal paths to provide coupler 108 (e.g., a proximity coupler) with the RF signal (e.g., a differential RF voltage drive of 0 and 180 degrees onto a proximity coupler).

Coupler 108 communicates with RFID device 110, for example, via short-range coupling (e.g., near field coupling techniques) as would be understood by one skilled in the art. Consequently, only RFID device 110 responds to the RF signal, while any other RFID devices in close proximity to RFID device 110 (e.g., such as other RFID devices on the roll) do not respond to the RF signal provided to RFID device 110.

For example, RFID device 110 may include an element 112, which, depending upon the type of the RFID device, may represent an antenna or a strap/interposer or other conducting portion of RFID device 110. Thus, coupler 108 may communicate with RFID device 110 via short-range coupling through element 112.

Coupler 108 may, for example, communicate to RFID device 110 through a gap in a metal shield through which the short-range coupling occurs, with the metal shield preventing the other RFID devices near RFID device 110 from receiving the RF signal provided to RFID device 110. Strips of metal to "short" the electric field, dielectric materials to de-tune or change the frequency, and high-permeability materials to interact magnetically and de-tune or change the frequency may also be employed, as would be understood by one skilled in the art.

Various conventional short-range coupling techniques are known and may be utilized to provide the RF signal from RF transmitter 102 to RFID device 110, as would be known by one skilled in the art. Additionally, communication between RF transmitter 102 and RFID device 110 via coupler 108 may be implemented as disclosed in U.S. patent application Ser. No. 10/367,515, filed Feb. 13, 2003, and entitled "RFID Device Tester and Method" and/or as disclosed in U.S. patent application Ser. No. 10/882,947, filed Jul. 1, 2004, and entitled "RFID Device Preparation System and Method," which are incorporated herein by reference in their entirety.

For example, referring briefly to FIG. 5, an RFID test system 500 for providing near field coupling is illustrated in accordance with an embodiment of the present invention. RFID test system 500 includes RF transmitter 102, RF detector 106, RFID device 110, and a coupler 502.

Coupler 502 may represent one or more pairs of couplers (e.g., coupler 108 or a number of couplers 108) to couple via an electric field with RFID device 110 (e.g., capacitively couple to element 112 of RFID device 110). Alternatively, or in addition, coupler 502 may represent a coil (e.g., single-turn coil or multi-turn coil) to couple via a magnetic field with RFID device 110 (e.g., inductively couple to element 112 of RFID device 110). Thus, coupler 502 may couple to RFID device 110 via an electric field, a magnetic field, or some combination of electric and magnetic fields (electromagnetic field), with coupler 502 providing the appropriate structure (e.g., parallel plates, single or multi-turn coils, transmission lines, or other types of structures). Furthermore, the signal frequency provided to RFID device 110 may be at a frequency different from the natural resonant frequency of RFID device 110, as discussed further in U.S. patent application Ser. Nos. 10/367,515 and 10/882,947.

Alternatively, coupler 108 may provide short-range coupling by making a direct connection with one or more conducting contact points of RFID device 110, as would be understood by one skilled in the art. For example, coupler 108 may make a direct connection with the antenna, the strap/interposer (e.g., conducting leads of the RFID device), or chip pads of RFID device 110, depending upon the type of RFID device being utilized. Thus, coupler 108 may provide short-range coupling in the near field via electric and/or magnetic fields or by direct connection with RFID device 110.

Referring back to FIG. 1, RFID test system 100 may also include a computer system 114 (e.g., a processor-based system or other type of decision-making circuit), which receives the results from RF detector 106 regarding each RFID device (e.g., RFID device 110) that is tested. Computer system 114 may also control RF transmitter 102 to control the operation of RFID test system 100.

RF detector 106 monitors signal path 104 and detects when RFID device 110 provides a response to the RF signal received from RF transmitter 102. For example, as illustrated in FIG. 1, RF transmitter 102 provides a modulated RF signal (e.g., a command signal) to RFID device 110, which prompts RFID device 110 to provide a response that is detected by RF detector 106. As discussed in further detail herein, RF detector 106 does not have to be implemented to receive and decode the complete response from RFID device 110, but rather simply detect that RFID device 110 responded to the RF signal from RF transmitter 102. If RFID device 110 responds or does not respond, then RFID device 110 passes the test or does not pass the test, respectively (e.g., response corresponds to satisfactory operation while no response corresponds to unsatisfactory operation).

In general, depending upon the type of RFID device being tested, RFID device 110 responds when sufficient energy is available to be rectified by RFID device 110 to serve as its power supply (e.g., a passive RFID device, although the techniques discussed herein are also applicable to active RFID devices) and an appropriate command is provided to RFID device 110. RFID device 110 responds, for example, by changing its input impedance using a data sequence, which in the far field results in a backscatter-modulated signal to be radiated while in the near field results in a change in the load presented to the source providing the RF signal to RFID device 110. The source (e.g., RF transmitter 102 or a driver circuit which may be included within an RF transmitter), depending upon its characteristics, may experience a change in the output voltage level or a change in the current drawn from it due to the changing load.

As illustrated in FIG. 1, in accordance with an embodiment of the present invention, RFID device 110 may be tested by applying an appropriately modulated RF signal, which results in a response if RFID device 110 is operational (e.g., a "good"

RFID device). By simply detecting that RFID device 110 has responded, rather than reading the entire response (i.e., determining the data provided by RFID device 110) of RFID device 110, RF detector 106 may be implemented in a simple and inexpensive manner as compared to conventional test techniques utilizing expensive RFID readers. Consequently, RFID device testing may be implemented as disclosed herein in a more cost effective manner and possibly in a faster and higher-volume manufacturing level.

For example, in accordance with an embodiment of the present invention, RF detector 106 detects the disturbance of the voltage level due to RFID device 110 responding (e.g., a digital 'good'/'bad' RFID device test). Thus, if RF detector 106 detects a response (e.g., a change in the digital state) from RFID device 110, then RFID device 110 is considered operational and passes the test. If RF detector 106 does not detect a response from RFID device 110 (e.g., no change in the digital state during the period a response should occur, as illustrated in FIG. 1), then RFID device 110 is considered defective and fails the test (e.g., failed to respond under the defined test conditions).

As an example, as illustrated in FIG. 1, an exemplary waveform 116 represents the RF signal (e.g., modulated with a command) provided by RF transmitter 102 to RFID device 110 and detected by RF detector 106. An exemplary waveform 118 represents the RF signal (e.g., a continuous RF signal level) provided by RF transmitter 102 to RFID device 110, during which RFID device 110 is expected to respond (e.g., as commanded). An exemplary waveform 120 represents the response provided by RFID device 110 and detected by RF detector 106, with the response indicating RFID device 110 is operational.

If RFID device 110 is not operational, then waveform 120 would be similar to waveform 118 (e.g., no response from RFID device 110). Furthermore, as explained herein, RF detector 106 does not have to retrieve the data in waveform 120 from RFID device 110, but rather simply detect a response (e.g., one or more voltage fluctuations) during the expected time period to determine that RFID device 110 is operational and responding to commands.

RF detector 106, for example, may be implemented as any type of conventional RF detector (e.g., a diode-based detector or an integrated circuit RF detector), as would be understood by one skilled in the art. In general, RF detector 106 provides a baseband voltage, which represents the amplitude of the RF signal rectified and integrated over time to remove voltage changes at the RF frequency and recover voltage changes due to the baseband signal modulation. The baseband voltage, for example, may be provided to a voltage comparator circuit, which will provide a digital signal (e.g., representing changes in the baseband signal).

As an exemplary implementation, referring briefly to FIG. 7, a block diagram of an RF detector circuit 700 is illustrated in accordance with an embodiment of the present invention. RF detector circuit 700 includes RF detector 106, capacitor 702 (AC coupling capacitor) and capacitor 704 (bypass capacitor), and a voltage comparator 706. RF detector 106, for example, may be a diode-based detector or an integrated circuit RF detector, as would be understood by one skilled in the art, to convert the RF frequency (e.g., from RF transmitter 102 or RFID device 110) into a filtered voltage to recover the baseband modulation. The filtered voltage may be received by voltage comparator 706 to provide a digital signal representative of the baseband signal.

For example, when RFID device 110 modulates its impedance, the signal level on coupler 108 will change, which is detected by RF detector 106 and provided to voltage comparator 706 via capacitor 702. Voltage comparator 706 converts a small AC voltage (e.g., a few mV) into a logic level signal at its output to indicate that a changing RF signal is detected by RF detector 106. Voltage comparator 706 may have its input terminals biased to the same voltage level (e.g., Vref) and may have a certain level of hysteresis to prevent the output from changing due to noise.

Thus, when the RF signal level is constant or changing slowly, the digital output from voltage comparator 706 will remain in a constant state. However, the digital output from voltage comparator 706 will change states, for example, to track the baseband modulation provided to RFID device 110 or provided by RFID device 110 (e.g., in response to a command).

Returning to FIG. 1, RFID test system 100 illustrates an approach for RFID device testing that enables parallel testing of a large number of RFID devices simultaneously at a relatively low cost and at a high efficiency. Consequently, utilizing the techniques disclosed herein may prevent the RFID device testing from becoming a limiting factor in terms of production speed or manufacturing cost.

Figure 2:
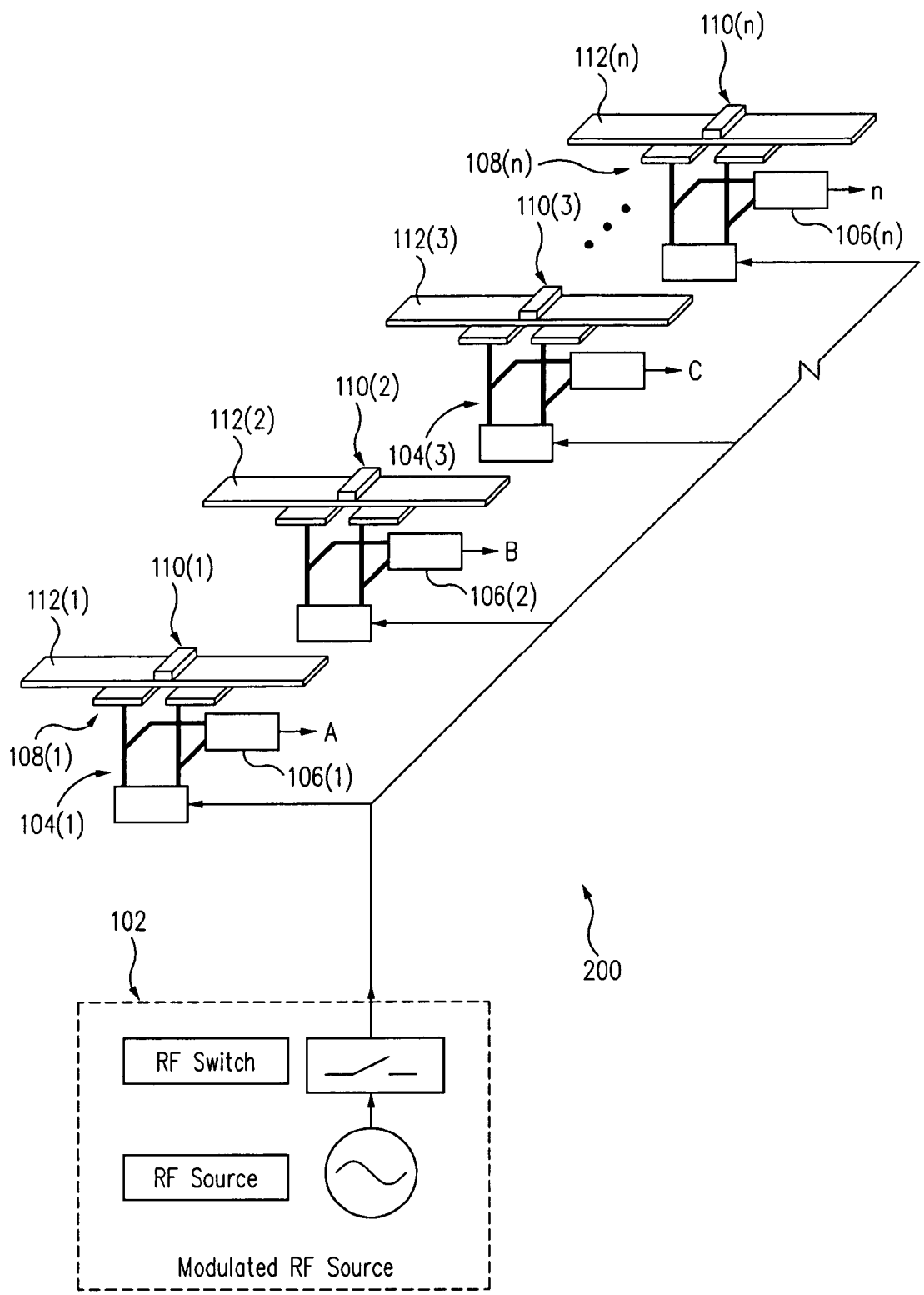
FIG. 2 shows a block diagram illustrating an RFID test system in accordance with an embodiment of the present invention.

For example, FIG. 2 shows a block diagram illustrating an RFID test system 200 in accordance with an embodiment of the present invention. RFID test system 200 illustrates the techniques for testing a number of RFID devices 110, which are separately referenced as RFID device 110(1) through 110(n), where "n" may represent any number of separate test stations for testing RFID devices 110.

RFID test system 200 may utilize one or more of the techniques disclosed in reference to FIG. 1 to provide a number of the parallel test stations. For example, RFID test system 200 includes RF transmitter 102, which provides the RF signal to RFID devices 110(1) through 110(n) via corresponding signal paths 104(1) through 104(n) and couplers 108(1) through 108(n). By examining the test results provided by RF detectors 106(1) through 106(n) (e.g., output signals labeled A, B, C, . . . , through n), it can be determined whether corresponding RFID devices 110(1) through 110(n) pass or fail their tests. Thus, RFID test system 200 may be implemented to test a large number of RFID devices simultaneously, which would allow a test system to meet the demands of high-speed manufacturing requirements (e.g., high-speed RFID inlay production technology).

As manufacturing speeds increase, additional time may be needed to deliver a sufficient amount of energy to the RFID devices (e.g., to energize or activate) before commencing communication. This can be achieved, for example in accordance with an embodiment of the present invention, by energizing the RFID devices prior to reaching the test positions.

Figure 3:
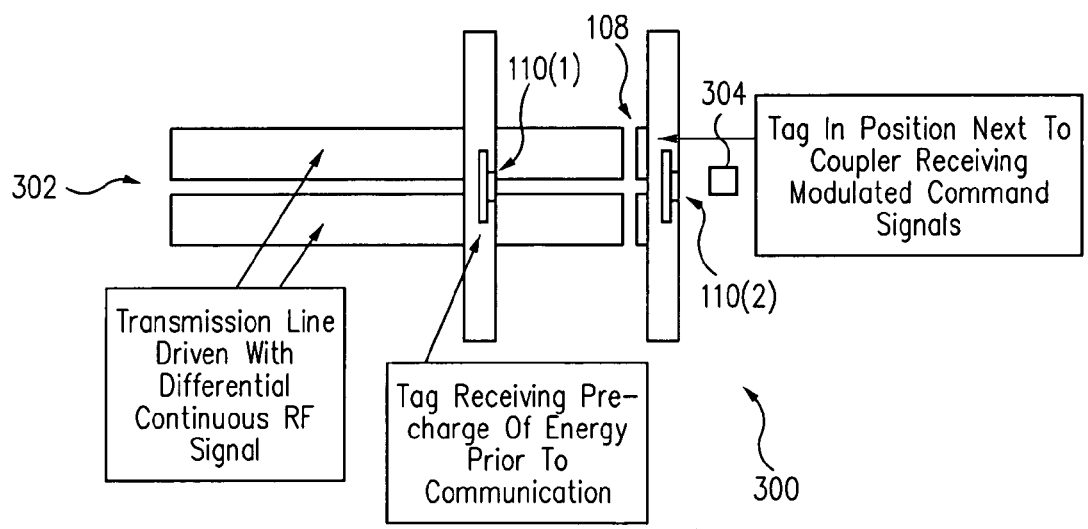
FIG. 3 shows a block diagram illustrating an RFID test technique, which may be applied to the RFID test systems of FIGS. 1 and 2, in accordance with an embodiment of the present invention.

For example, FIG. 3 shows a block diagram illustrating an RFID test system 300, which illustrates techniques that may be applied to RFID test systems 100 and 200 (FIGS. 1 and 2), in accordance with an embodiment of the present invention. RFID test system 300 includes a transmission line 302 (e.g., a pair of transmission lines) that is driven with a differential, continuous RF signal to energize the RFID devices near (e.g., traveling along) transmission line 302 prior to being tested.

As an example, RFID device 110(1) is shown receiving energy from transmission line 302 prior to being tested, while RFID device 110(2) is shown being tested and communicating via coupler 108 (as discussed herein, for example, in reference to FIG. 1). RFID device 110(2) received energy from transmission line 302 prior to reaching the test position over coupler 108, and therefore, may require less time prior to communicating with coupler 108 or less time within range of coupler 108.

In general, the communication techniques and protocols (e.g., commands, frequencies, power levels, and/or modulation scheme) depends upon the type of RFID device and/or the protocol that the RFID device is designed to accommodate. Furthermore, the techniques disclosed herein may be applied to near-field testing or far-field testing. In general, an antenna of the RFID device may be viewed as having a near field region and a far field region. The near field region refers to a reactive near field (e.g., approximately $R \leq \lambda/2\pi$) and a radiating near field (e.g., approximately $R<2D^2/\lambda$), while the far field region refers to a radiating far-field component (e.g., approximately $R>2D^2/\lambda$), where R is the distance from the antenna and D is the largest dimension of the antenna.

One factor that may also influence the type of testing performed is the regulatory environment in the country (e.g., communication data rate, bandwidth, or power levels permitted for radio frequencies). For example, North America may permit RFID reader to RFID device data rates of approximately 140.35 kbps, while Europe may permit RFID reader to RFID device data rates of approximately 30 kbps for radiating systems. However, these limitations may not apply if near-field coupler techniques, for example, are utilized, because the radiated energy may fall below the levels at which the regulatory rules are applied.

As an example of an exemplary application (e.g., in reference to FIG. 1), an RFID device test may be performed to verify general operation (e.g., an expected response to a command), which may include a write test to verify receipt and operation of various components of the RFID device (e.g., memory). As a specific implementation example, based on the electronic product code (EPC) Class 1 data specification and employing the XRA00 RFID chip from STMicroelectronics, a SCROLLALLID command sent to the RFID chip (e.g., represented by RFID device 110) will result in the RFID chip to respond with its entire identification (ID) code (e.g., an 8-bit preamble, a 16-bit cyclic redundancy checksum, and a 96-bit ID).

As noted above, to determine that the RFID chip is operational (depending upon the test objectives), it may not be necessary to receive the entire response from the RFID chip. For example, to determine whether the RFID chip is operational (e.g., the RFID chip is good or bad), the test may be completed and the RFID chip moved beyond the range of the test station (e.g., beyond the range of coupler 108) after one or more bits has been received (e.g., one or more bits of the preamble). Thus, the test may be completed faster relative to conventional test techniques by determining whether the RFID chip is operational before the complete response has been received from the RFID chip.

A write test may also be performed, for example, on the RFID chip to determine whether various circuits are operational, such as the memory. By utilizing the techniques disclosed herein, in accordance with one or more embodiments of the present invention, the write test may be performed quickly for one or more of the RFID chips in parallel.

For example, as a specific implementation example (e.g., in reference to FIG. 1 or 2), the RFID chips may be programmed (by couplers 108 or prior to arriving at the test station of couplers 108) by providing an ERASEID command to erase the entire memory array of the RFID chips (e.g., setting all bits to zero). The RFID chips may then be provided with a PROGRAMID command to program (e.g., simultaneously) the RFID chips with a defined ID (e.g., 96 bits all equal to one). A SCROLLID command may then be sent with its masking selective ID set to all ones so that only the RFID chips that have successfully been programmed with the defined ID will respond (e.g., by modulating the RF carrier as discussed above). As disclosed herein, the entire response does not need to be detected, only that the RFID chip responds or starts to respond as expected. Therefore, the write test can be performed quickly and in a parallel fashion.

As discussed previously, a challenge associated with RFID devices is the issue of RFID devices that are found to be defective. If the defective RFID devices (e.g., on the roll) are not identified in some fashion, the defective RFID devices may be inadvertently used by a customer, with undesirable consequences.

In accordance with an embodiment of the present invention, an RFID device found to be defective may be identified by various techniques, including rendering the RFID device unusable (also known as killing the RFID device). For example, the RFID device may be physically removed from the manufacturing process (e.g., production line) or physically damaged or marked (e.g., including the chip or strap or the joints between subsections of the RFID inlay). The RFID device, for example, may also be rendered unusable by issuing a kill command in accordance with the RFID's specifications or standards (e.g., EPC standards), which generally prevents the RFID device from responding further to RFID reader queries or commands. For example, EPC's kill command may be viewed as a function that permanently disables an RFID device from providing backscatter modulation. Thus, the EPC's kill command ensures that the RFID device can no longer be detected by an RFID reader providing interrogating signals in conformity with a data standard or by any other communications in the form of backscatter modulation.

A system that provides the kill command to the defective RFID devices as a technique for indicating good/bad status may have a number of advantages. For example, defective RFID devices are prevented from being reprogrammed and sold, which may be relevant in terms of security issues or quality control issues. Furthermore, the kill command may be incorporated into the test techniques disclosed herein (e.g., in reference to FIGS. 1 to 3), with the RFID devices tested rapidly (e.g., before the RFID device has completely responded). Thus, the RFID devices may be tested and the defective RFID devices culled (e.g., via the kill command) in a high-speed production environment.

Figure 4:
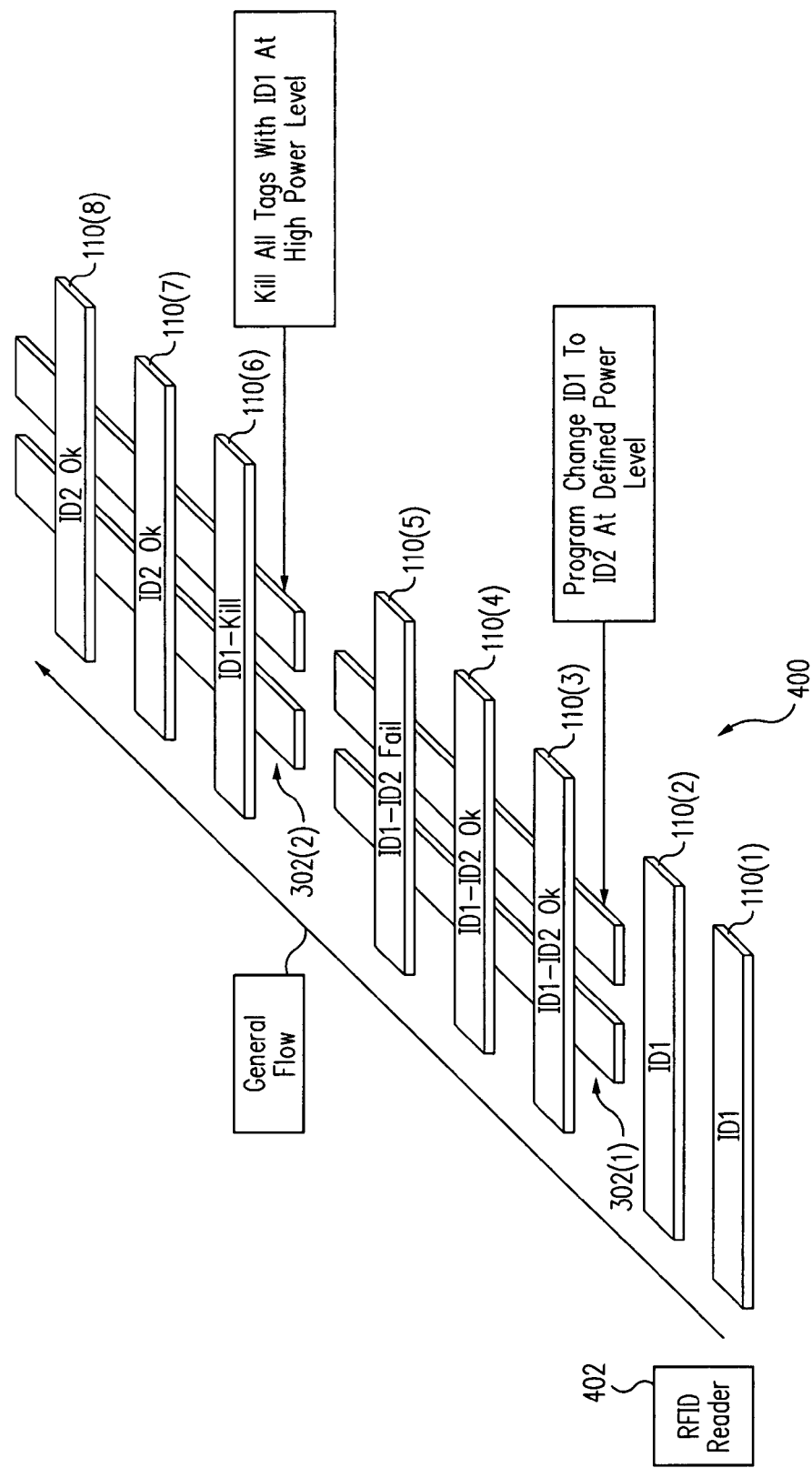
FIG. 4 shows a block diagram illustrating an RFID test system in accordance with an embodiment of the present invention.

For example, FIG. 4 shows a block diagram illustrating an RFID test system 400 in accordance with an embodiment of the present invention. RFID test system 400 includes an exemplary number of RFID devices 110(1) through 110(8) and transmission lines 302(1) and 302(2). An arrow in FIG. 4 designates the general flow or direction of travel for RFID devices 110 for this exemplary implementation.

For example, if RFID devices 110 are not initially programmed (e.g., having no identification or all identification ID1), RFID devices 110 may be tested by programming them at a defined power level to a new identification (e.g., ID2), which may only be different from ID1 by one bit or more. The programming operation may employ near field or far field RFID communication techniques, with RFID devices 110 moving by an RFID reader or simplified RF transmission source (e.g., RF transmitter 102) that provides the programming command at the desired level (e.g., a program zone).

As shown in FIG. 4 for example, a transmission line 302(1) may be employed to perform the programming operation (e.g., RF transmitter 102 driving transmission line 302(1) to provide the programming command). Therefore, as illustrated in FIG. 4, RFID devices 110(1) and 110(2) are initially at ID1, while RFID devices 110(3) through 110(5) are being programmed from ID1 to ID2 as they travel over transmission line 302(1).

After the programming operation, RFID devices 110 that are operational have changed from ID1 to ID2, while defective ones of RFID devices 110 are still at ID1. For example, as illustrated in FIG. 4, RFID devices 110(5) and 110(6) are defective and failed to be programmed from ID1 to ID2.

RFID devices 110 then enter a zone where the defective RFID devices 110 are identified or disabled in some fashion. For example, as illustrated in FIG. 4, RFID devices 110 enter a "killing zone" where the kill command is transmitted (e.g., repeatedly at high power levels via a transmission line 302(2)) for RFID devices 110 that failed to be programmed and retain the ID1 identification (e.g., RFID device 110(6)). Thus, RFID devices 110, which fail to be programmed, are killed.

The program zone and the kill zone may be performed using near field and/or far field techniques. As an exemplary implementation, the zones may be provided using linear transmission lines (e.g., transmission lines 302(1) and 302(2)), with RFID devices 110 within the near field of the transmission lines for a sufficient duration to complete the desired operation. As an example, if RFID devices 110 are formed as part of a carrier web or roll, with the carrier web moving at 300 fpm, then the program zone (i.e., write zone) and the kill zone would each be approximately 2.5 feet in length (e.g., assuming that the programming operation and the killing operation each take approximately 0.5 seconds to complete).

One advantage of this killing technique is that there is no need to communicate individually (i.e., separately) with each RFID device 110, but rather all of RFID devices 110 receive the same commands in parallel. However, if RFID devices 110 are preprogrammed, then an RFID reader 402 (e.g., a reading stage, such as a short zone employing one or more near field couplers) may be included in RFID test system 400 and positioned prior to the program zone to acquire the preprogrammed ID or IDs of RFID devices 110. The program zone, as discussed above, would then reprogram RFID devices 110 and the killing zone would kill anything that retains its preprogrammed ID. Thus, RFID devices 110 that fail to operate properly (e.g., fails the program operation or falls below a required performance threshold but is still readable) is disabled and is not utilized by customers or others farther down the supply chain.

The kill zone technique discussed in reference to FIG. 4 may be incorporated into RFID test system 100 (FIG. 1), RFID test system 200 (FIG. 2), or RFID test system 300 (FIG. 3) to disable or otherwise mark to identify RFID devices that fail the test. For example, referring to FIG. 3, transmission line 302 may be employed to reprogram RFID device 110(1) to a new identification (e.g., from ID1 to ID2), with RFID device 110(1) tested via coupler 108. As another example, referring to FIG. 1 or 2, RF transmitter 102 via coupler 108 may be employed to program (or reprogram) RFID device 110 to a new identification (e.g., from ID1 to ID2) prior to entering the kill zone (e.g., as discussed in reference to FIG. 4).

As another example, in accordance with an embodiment of the present invention, the program zone (FIG. 4) may be implemented utilizing transmission line 302(1) and/or a far field RFID programmer (e.g., RFID reader/writer) to provide a rapid technique for programming a valid identification into a large number of un-initialized RFID devices (e.g., RFID devices 110). This may provide certain advantages as RFID commands and processes may be more time efficient for RFID devices that have a valid identification rather than no identification or an invalid identification.

Furthermore, parallel programming techniques to program a large number of RFID devices 110 simultaneously may provide a more time-efficient process as typical programming times for individual RFID devices may range, for example, from 0.1 to 1 second. The parallel programming, for example, may be performed with individual couplers (e.g., coupler 108 of FIGS. 1 and 2), which may also verify the programming by confirming a response to the programmed identification, or with transmission lines (e.g., transmission line 302(1) of FIG. 4). For example, one transmission line may program a large number of the RFID devices (e.g., seventy or more simultaneously) and subsequent couplers may test the RFID devices to verify a response to the programmed identification (e.g., 10 ms or less verification check).

After testing, a subsequent killing zone marks or disables the RFID devices that are still at ID1 and/or that fail the test. For example, an optional element 304 is shown following the test position associated with coupler 108. Element 304 (e.g., a classifying device) may represent a device for marking, such as for example painting, scratching, damaging (e.g., punching a hole in RFID device 110, such as the antenna), separating, or otherwise providing an indication on an RFID device that is tested and found to be defective. Alternatively, or in addition, element 304 may provide a kill command to an RFID device that is tested and found to be defective and/or that remains at an invalid identification. For example, element 304 may issue the kill command to every RFID device, but the kill command will only disable the defective RFID devices that failed the write test and remain at an invalid or old identification.

FIG. 6 shows a flowchart 600 providing exemplary operations for an RFID test system in accordance with an embodiment of the present invention. In general, flowchart 600 provides general operations that may be performed by an RFID test system in accordance with one or more embodiments of the present invention. One or more of the general operations may be optional or performed in a different order, depending upon the test objectives or desired application.

For example, the RFID devices may be read (block 602) if information is desired from the RFID devices, such as their identification when preprogrammed. The RFID devices may be programmed with a different identification and/or provided energy (block 604) to power up, such as prior to testing or prior to entering a kill zone. The RFID devices are tested (block 606), with the test complete, for example, upon detection of the start of a response from the RFID devices. The RFID devices determined to be defective may have some action taken against them, such as by marking (e.g., painting or scratching), damaging, separating, and/or provided with a kill command.

Systems and methods are disclosed herein to provide radio frequency identification (RFID) test techniques and techniques directed to RFID devices that are determined to be defective. For example, in accordance with an embodiment of the present invention, an RFID device may be tested by providing a defined level of energy and a command, with the RFID device's response detected. It is not necessary to receive the complete reply of the RFID device, but simply that the RFID device has responded.

This technique enables considerable simplification of test systems, which may reduce cost and reduce the time required for testing. For example, rather than requiring an RFID reader to communicate with every RFID device in a test position, either sequentially by scanning a reader through many tags or in parallel by using multiple readers, a common data command may be provided to a large number of RFID devices simultaneously. A simple circuit may then detect the fact that the RFID device has either responded or not (e.g., not receive the entire reply data), which determines whether the RFID device is judged to be good or bad.

Furthermore, the technique may be applied to programming tests. For example, a common program command may be issued to a number of the RFID devices (e.g., inserting the same ID into their memory). A command is then provided to the RFID devices with the same ID to respond. Because only the RFID devices that have been successfully written to respond, a simultaneous write test has been achieved.

Additionally, techniques are disclosed for marking or disabling the RFID devices that fail the test. For example, the defective RFID devices may be disabled via a kill command. The kill command may be provided during the manufacturing and testing process and may be performed in a cost effective and high-speed manner.

Embodiments described above illustrate but do not limit the invention. It should also be understood that numerous modifications and variations are possible in accordance with the principles of the present invention. Accordingly, the scope of the invention is defined only by the following claims.

I claim:

1. A radio frequency identification (RFID) test system comprising:
   a transmission system for providing a radio frequency signal to a plurality of RFID devices;
   a plurality of radio frequency detectors configured to detect a response to the radio frequency signal from the corresponding RFID devices; and
   a circuit coupled to the radio frequency detectors and adapted to determine whether each of the plurality of RFID devices is operational based on whether the response was detected by the corresponding radio frequency detector, wherein the RFID device is deemed operational if the response was detected and without the circuit decoding all of the response.

2. The RFID test system of claim 1, wherein the transmission system comprises:
   a radio frequency transmitter;
   a plurality of couplers, coupled to the radio frequency transmitter, adapted to receive the radio frequency signal from the radio frequency transmitter and provide in a near field the radio frequency signal to the corresponding RFID devices.

3. The RFID test system of claim 2, wherein the plurality of couplers communicate with the corresponding RFID devices in the near field by at least one of an electric field and a magnetic field.

4. The RFID test system of claim 1, wherein each of the plurality of radio frequency detectors further comprises a voltage comparator.

5. The RFID test system of claim 1, wherein the plurality of radio frequency detectors detect the response based on only a portion of the response from the corresponding RFID devices.

6. The RFID test system of claim 1, further comprising a second transmission system adapted to provide at least one of an energy source and a program command to the plurality of RFID devices.

7. The RFID test system of claim 6, further comprising an RFID reader adapted to read data from the plurality of RFID devices.

8. The RFID test system of claim 6, further comprising a third transmission system adapted to provide a kill command to the plurality of RFID devices.

9. The RFID test system of claim 8, wherein the second and third transmission systems each comprises a transmission line.

10. The RFID test system of claim 1, further comprising a classifying device adapted to provide at least one of an identifying mark or a kill command to defective ones of the plurality of RFID devices.

11. A radio frequency identification (RFID) device test system comprising:
    means for providing a signal to at least one RFID device;
    means for detecting if the at least one RFID device responds based on a portion of any reply provided by the at least one RFID device to the signal; and
    means for determining if the at least one RFID device is operational based on whether the at least one RFID device responds, wherein the at least one RFID device is deemed operational if the detecting means detects the portion of any rely without decoding all of the reply.

12. The RFID device test system of claim 11, wherein the providing means comprises at least one near field coupler for providing the signal to the at least one RFID device.

13. The RFID device test system of claim 11, further comprising:
    means for programming the at least one RFID device to store a first value; and
    means for providing a kill command to the at least one RFID device, wherein the kill command disables the at least one RFID device that fail to store the first value.

14. The RFID device test system of claim 11, further comprising means for identifying the at least one RFID device that fails to respond.

15. The RFID device test system of claim 14, wherein the identifying means comprises at least one of a marking and a kill command.

16. The RFID device test system of claim 11, further comprising means for energizing the at least one RFID device prior to providing the signal to the at least one RFID device.

17. A radio frequency identification (RFID) device test system comprising:
    means for programming at least one RFID device to a first value;
    means for testing the at least one RFID device, wherein the testing means passes the at least one RFID device if the at least one RFID device begins to reply to a signal provided by the testing means; and
    means for providing a kill command to the at least one RFID device to disable the at least one RFID device that fail to store the first value.

18. The RFID device test system of claim 17, wherein the testing means provides the signal to the at least one RFID device via a near field region.

19. A method of performing radio frequency identification (RFID) device testing, the method comprising:
    providing a signal to at least one RFID device;
    detecting if the at least one RFID device begins to respond to the signal; and
    determining if the at least one RFID device is operational based upon whether the at least one RFID device begins to respond to the signal, wherein the at least one RFID device is deemed operational if the at least one RFID device begins to respond to the signal during an expected time frame.

20. The method of claim 19, further comprising marking the at least one RFID device that is determined to be not operational.

21. The method of claim 19, further comprising providing a kill command to the at least one RFID device that is determined to be not operational.

22. The method of claim 19, further comprising:
    programming the at least one RFID device;

providing a kill command to the at least one RFID device, wherein the kill command disables the at least one RFID device that fails the programming.

23. A method of performing radio frequency identification (RFID) device testing, the method comprising:
   programming a plurality of RFID devices with a first value;
   providing a signal to the plurality of RFID devices;
   determining if each one of the plurality of RFID devices is operational based upon whether the RFID device begins to reply to the signal; and
   providing a kill command to the plurality of RFID devices, wherein the RFID devices of the plurality of RFID devices, which fail to store the first value, will be disabled.

24. The method of claim 23, wherein any reply to the signal from the RFID device is detected in a near field region.

25. A radio frequency identification (RFID) test system comprising:
   a transmission system for providing a radio frequency signal to a plurality of RFID devices;
   a plurality of radio frequency detectors configured to detect a response to the radio frequency signal from the corresponding RFID devices, wherein each of the plurality of radio frequency detectors further comprises a voltage comparator; and
   a circuit coupled to the radio frequency detectors and adapted to determine whether each of the plurality of RFID devices is operational based on whether the response was detected by the corresponding radio frequency detector.

* * * * *